United States Patent
Culver et al.

(10) Patent No.: US 8,865,337 B2
(45) Date of Patent: Oct. 21, 2014

(54) MODULAR BATTERY, AN INTERCONNECTOR FOR SUCH BATTERIES AND METHODS RELATED TO MODULAR BATTERIES

(75) Inventors: Duncan Culver, Howell, NJ (US); Christopher K. Dyer, Madison, NJ (US); Michael L. Epstein, Bedminster, NJ (US)

(73) Assignee: Lightening Energy, Dover, NJ (US)

( * ) Notice: Subject to any disclaimer, the term of this patent is extended or adjusted under 35 U.S.C. 154(b) by 1311 days.

(21) Appl. No.: 12/383,334

(22) Filed: Mar. 23, 2009

(65) Prior Publication Data

US 2009/0239130 A1    Sep. 24, 2009

Related U.S. Application Data

(60) Provisional application No. 61/070,752, filed on Mar. 24, 2008.

(51) Int. Cl.
| | | |
|---|---|---|
| *H01M 2/24* | (2006.01) | |
| *H01M 10/0585* | (2010.01) | |
| *H01M 2/20* | (2006.01) | |
| *H01M 10/052* | (2010.01) | |

(52) U.S. Cl.
CPC ............ *H01M 2/206* (2013.01); *Y02T 10/7011* (2013.01); *Y02E 60/122* (2013.01); *H01M 10/0585* (2013.01); *H01M 10/052* (2013.01)
USPC ............................. 429/151; 429/159; 429/160

(58) Field of Classification Search
USPC .......... 429/121, 151, 158, 159, 160, 188, 211
See application file for complete search history.

(56) References Cited

U.S. PATENT DOCUMENTS

| 3,056,850 A | 10/1962 | Rauske |
| 3,844,841 A | 10/1974 | Baker ........................... 136/111 |
| 4,044,192 A * | 8/1977 | Bowser et al. ................ 429/112 |
| 4,957,829 A | 9/1990 | Holl |
| 5,256,502 A | 10/1993 | Kump ............................ 429/150 |
| 5,346,786 A | 9/1994 | Hodgetts ....................... 429/159 |
| 5,393,617 A | 2/1995 | Klein .............................. 429/59 |
| 5,429,643 A | 7/1995 | Lund et al. |

(Continued)

FOREIGN PATENT DOCUMENTS

| CN | 1459884 A | 12/2003 |
| JP | 2005-149833 | 6/2005 |

(Continued)

OTHER PUBLICATIONS

International Search Report from PCT/US2010/001248 (corresponds to US 2010/0273044 A1).

(Continued)

*Primary Examiner* — Yogendra Gupta
*Assistant Examiner* — Emmanuel S Luk
(74) *Attorney, Agent, or Firm* — Davidson, Davidson & Kappel, LLC

(57) ABSTRACT

A modular battery includes a first planar battery cell having a first planar electrode surface, a second planar battery cell having a second planar electrode surface, and a compressible interconnector disposed between the first planar surface and the second planar surface and electrically connecting the first and second planar electrode surfaces. Other embodiments of a modular battery, an interconnector and methods are also disclosed.

19 Claims, 9 Drawing Sheets

(56) References Cited

U.S. PATENT DOCUMENTS

| | | | |
|---|---|---|---|
| 5,552,243 A | 9/1996 | Klein | 429/157 |
| 5,582,937 A | 12/1996 | LaFollette | |
| 5,595,839 A | 1/1997 | Hossain | |
| 6,040,085 A | 3/2000 | Cheu et al. | |
| 6,086,643 A | 7/2000 | Clark et al. | |
| 6,143,445 A * | 11/2000 | Ferment et al. | 429/218.1 |
| 6,458,491 B1 * | 10/2002 | Wimberly et al. | 429/254 |
| 6,492,053 B1 | 12/2002 | Donelson et al. | 429/34 |
| 6,500,319 B2 | 12/2002 | LaConti et al. | |
| 6,517,967 B1 | 2/2003 | Shrim et al. | |
| 6,887,620 B2 | 5/2005 | Klein et al. | 429/210 |
| 6,924,427 B2 * | 8/2005 | Eckert et al. | 136/252 |
| 6,969,567 B1 | 11/2005 | Higley et al. | |
| 7,163,761 B2 | 1/2007 | Debe et al. | 429/37 |
| 7,270,912 B2 * | 9/2007 | Oogami | 429/159 |
| 7,462,416 B2 | 12/2008 | Kim | |
| 7,737,356 B2 * | 6/2010 | Goldstein | 136/251 |
| 7,993,771 B2 * | 8/2011 | Gutsch et al. | 429/99 |
| 7,993,776 B2 * | 8/2011 | Lee et al. | 429/159 |
| 8,003,268 B2 * | 8/2011 | Smith | 429/418 |
| 8,313,854 B2 * | 11/2012 | Origuchi et al. | 429/151 |
| 2001/0049054 A1 | 12/2001 | Ecomoto et al. | |
| 2002/0081474 A1 * | 6/2002 | Foster | 429/30 |
| 2002/0136946 A1 | 9/2002 | Amatucci et al. | |
| 2003/0013009 A1 | 1/2003 | Dansui et al. | |
| 2003/0013015 A1 | 1/2003 | Klein et al. | |
| 2003/0031920 A1 * | 2/2003 | Hoffman et al. | 429/66 |
| 2003/0194605 A1 | 10/2003 | Fauteux et al. | |
| 2004/0038123 A1 | 2/2004 | Hisamitsu et al. | |
| 2004/0096724 A1 | 5/2004 | Debe et al. | |
| 2005/0031953 A1 | 2/2005 | Watanabe et al. | |
| 2005/0089751 A1 | 4/2005 | Oogami et al. | 429/162 |
| 2005/0214638 A1 | 9/2005 | Asahina et al. | |
| 2006/0057433 A1 | 3/2006 | Ando et al. | |
| 2006/0073385 A1 * | 4/2006 | Andrin et al. | 429/185 |
| 2006/0083986 A1 | 4/2006 | Li et al. | |
| 2006/0121342 A1 | 6/2006 | Sano et al. | 429/162 |
| 2006/0188776 A1 | 8/2006 | Aker et al. | |
| 2006/0203429 A1 | 9/2006 | Thrap et al. | |
| 2006/0292443 A1 | 12/2006 | Ogg et al. | |
| 2007/0015047 A1 | 1/2007 | Hosaka et al. | |
| 2007/0026283 A1 * | 2/2007 | LaConti et al. | 429/32 |
| 2007/0026739 A1 | 2/2007 | Kim et al. | 439/627 |
| 2007/0128472 A1 | 6/2007 | Tierney | |
| 2007/0158574 A1 | 7/2007 | Petrillo et al. | 250/370.13 |
| 2007/0248855 A1 * | 10/2007 | Reinert | 429/19 |
| 2008/0070068 A1 * | 3/2008 | Fritz et al. | 429/12 |
| 2008/0070102 A1 | 3/2008 | Watanabe | |
| 2008/0070106 A1 | 3/2008 | Hock et al. | |
| 2008/0090136 A1 | 4/2008 | Kim et al. | |
| 2008/0124625 A1 * | 5/2008 | Hock et al. | 429/176 |
| 2008/0131764 A1 | 6/2008 | Saiki | |
| 2008/0182157 A1 * | 7/2008 | Visco et al. | 429/50 |
| 2008/0266752 A1 | 10/2008 | Thrap et al. | |
| 2008/0318133 A1 | 12/2008 | Matsuyama et al. | |
| 2009/0023061 A1 * | 1/2009 | Ogg et al. | 429/162 |
| 2009/0123820 A1 * | 5/2009 | Han | 429/121 |
| 2009/0305125 A1 | 12/2009 | Kosugi et al. | |
| 2010/0035127 A1 * | 2/2010 | Brilmyer et al. | 429/50 |
| 2010/0104927 A1 | 4/2010 | Albright | |
| 2010/0167116 A1 | 7/2010 | Okada | |
| 2010/0273044 A1 | 10/2010 | Culver et al. | |
| 2010/0310923 A1 * | 12/2010 | Ogg et al. | 429/162 |
| 2011/0014501 A1 * | 1/2011 | Scheucher | 429/7 |
| 2011/0080139 A1 * | 4/2011 | Troxel et al. | 320/134 |
| 2011/0159351 A1 | 6/2011 | Culver et al. | |
| 2011/0159352 A1 | 6/2011 | Culver et al. | |
| 2011/0177383 A1 | 7/2011 | Culver et al. | |
| 2011/0189525 A1 * | 8/2011 | Palanchon et al. | 429/120 |
| 2011/0195297 A1 * | 8/2011 | Ouchi et al. | 429/152 |
| 2011/0200867 A1 | 8/2011 | Culver et al. | |
| 2011/0200873 A1 * | 8/2011 | Hu et al. | 429/188 |
| 2012/0028097 A1 * | 2/2012 | Oury | 429/120 |

FOREIGN PATENT DOCUMENTS

| | | |
|---|---|---|
| JP | 2007-299680 | 11/2007 |
| WO | WO 03096441 A2 | 11/2003 |
| WO | WO 2007086495 A1 | 8/2007 |

OTHER PUBLICATIONS

International Search Report from PCT/US2010/003156 (corresponds to US 2011/0159352 A1).

International Search Report from PCT/US2010/003154 (corresponds to US 2011/0159351 A1).

International Search Report from PCT/US2011/000077 (corresponds to US 2011/0177383 A1).

International Search Report from PCT/US2011/000276 (corresponds to US 2011/0200867 A1).

* cited by examiner

Positive                Negative

MODULAR BATTERY, AN INTERCONNECTOR FOR SUCH BATTERIES AND METHODS RELATED TO MODULAR BATTERIES

This claims the benefit of U.S. Provisional Patent Application Ser. No. 61/070,752 filed Mar. 24, 2008.

The present invention relates to a modular battery, an interconnector for a modular battery and methods related to modular battery.

BACKGROUND

Modular batteries are batteries which comprise two or more battery cells or cell modules or cells. A common example of a device using a modular battery is a hand held flashlight which may use for example two C cells.

Recently, modular batteries have become important in many applications, including hybrid electric vehicles ("HEV"), plug-in hybrid electric vehicles ("PHEV"), and other applications. When used in HEV, PHEV, and other applications, in addition to being durable, safe and cost effective, modular batteries are required to deliver a great deal of power.

Applications of modular batteries, like the hand-held flashlight, require the use of multiple battery cells connected in series. However, the modular batteries for HEVs and PHEVs, for example, may differ from the modular C cells used in a common flashlight.

U.S. Pat. Nos. 5,552,243 and 5,393,617 disclose a bipolar electrochemical battery of stacked wafer cells. The wafer cells are electrically connected in series with the positive face of each cell contacting the negative face of the adjacent cell. The cell-to-cell contact may be enhanced by use of a conductive paste or cement. The stack assembly is held in compression. U.S. Pat. Nos. 5,552,243 and 5,393,617 are hereby incorporated by reference herein.

SUMMARY OF THE INVENTION

The present invention provides a modular battery comprising a first planar battery cell having a first planar electrode surface, a second planar battery cell having a second planar electrode surface, and a compressible interconnector disposed between the first planar surface and the second planar surface and electrically connecting the first and second planar electrode surfaces.

The present invention also provides a modular battery comprising a first planar battery cell having a first planar electrode surface, a second planar battery cell having a second planar electrode surface, and an interconnector disposed between the first planar surface and the second planar surface and electrically connecting the first and second planar electrode surfaces, the interconnector being removable as a modular unit with respect to the first and second planar battery cells.

Further provided by the present invention is an interconnector for a modular battery comprising an electrically conductive compressible layer. The present invention also provides an interconnector for a modular battery comprising a layer of electrically conductive fibers.

A method for assembling a modular battery is provided by the present invention as well, the method comprising placing a first planar battery cell in a housing, placing an interconnector over the first planar battery cell, the interconnector being one of a compressible interconnector, an interconnector including electrically conductive fibers, or a modular interconnector unit, placing a second planar battery cell over the interconnector, and forcing the first planar battery cell and the second planar battery cell toward each other.

The present invention yet further provides a method of maintaining a battery comprising monitoring a set of planar battery cells, identifying a defective planar battery cell from the set of substantially planar battery cells, removing the defective planar battery cell, causing a compressible interconnector to expand, and inserting a non-defective planar battery cell in a manner that compresses the compressible interconnector.

BRIEF DESCRIPTION OF THE DRAWINGS

The present invention will be described with respect to a preferred embodiment, in which:

FIG. 3A is a schematic front view of a sealed single cell showing the cell module with the front frame section removed, while

FIG. 6A schematically illustrates a cross-section of a modular battery having six cell modules within an enclosure with feedthroughs, while

Figure 1A:
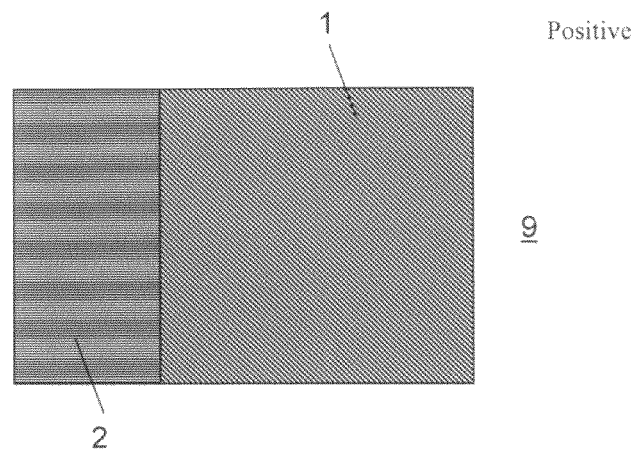
FIGS. 1A, 1B, 1C and 1D are plan views of four types of electrodes that may be used in the present invention.

The drawings are schematic in nature and not to scale. For clarity and ease of understanding, some elements have been exaggerated in size.

DETAILED DESCRIPTION

In order to be powerful enough for HEVs, PHEVs, and other applications, it is desirable to use modular batteries containing cells with a high surface to volume ratio, for example using a planar design for each cell of the battery. These cells may be, for example, about the size of a large book wherein the "front" of the book contains, for example, a positive terminal (also known as an electrode) and the "back" of the book contains, for example, a negative terminal. Unlike their cylindrical counterparts (e.g., C cell batteries) which use a raised dimple at one end of a cell to make electrical contact with the next cylindrical cell, substantially planar cells need not have such raised dimple(s).

However, due to manufacturing techniques and tolerances, substantially planar cells have many surface irregularities, making good electrical contact with other substantially planar cells difficult to achieve. From a cost perspective, it is not practical to adjust manufacturing techniques to reduce surface irregularities. Without good electrical contact, it is difficult to transfer power from one substantially planar cell to the next, making high power applications difficult. Since one plane of a substantially planar cell is not flush with a plane of another substantially planar cell, this reduction in surface contact area ultimately raises the resistance between adjacent cells. Even if the irregularities in electrical contact are minimized for two given substantially planar cells (e.g., the "front" and "back" of the books fit perfectly and make good contact), once one of the cells fails, it is highly unlikely that the replacement cell will have the same irregularities. Consequently, power is reduced due to the higher resistance. A second shortcoming is that although conductive pastes and/or conductive cements may be used to smooth out or fill in the irregularities, the pastes and/or cements provide a higher resistance to connections between cells. Another problem with using conductive cements and/or conductive pastes is that once cells are cemented or pasted together, the replacement of a single faulty cell within a multi-cell modular battery becomes quite burdensome. A third shortcoming is that irregularities on surfaces of substantially planar battery cells may change during operation of an HEV, PHEV, and/or other device using such a battery. These irregularities may change due to changes in temperature, shock, vibration and/or other conditions.

It is an object of the present invention to provide an interconnector for a multi-celled battery that provides good electrical conductivity between two cells. It is a further alternate or additional object of the present invention to provide for an interconnector that can dampen shocks and/or vibrations between two cells. Still a further alternate or additional object of the present invention is to provide an interconnector that can permit easy replacement of planar cells. Yet one further alternate or additional object of the present invention is to provide interconnectors that permit the battery to be compressed to increase electrical conductivity.

The modular battery of the present invention is comprised of a plurality of individual cell modules stacked on one another and electrically connected together in series by electrically conducting interconnectors. The interconnectors advantageously can be compressible to reduce vibrational or shock damage to the cell modules. Alternately or additionally, the interconnectors can include electrically conducting fibers, which can permit lower electrical resistance and/or ease of manufacture for compressible interconnectors. Alternately or additionally, the interconnectors can be modular and removable as a unit, so as to permit easy removal and replacement of individual cell modules, and so that the interconnectors do not need to be viscous or adhesive as with pastes or cements respectively.

The stacked cell modules can be restrained mechanically by a light-weight external enclosure. Several embodiments and illustrative examples of the battery of the present invention are described below.

Cell Module

The cell module of the preferred embodiment of the present invention can have a rigid or semi-rigid flat shape with a positive and a negative surface on opposite sides which are in electrical communication with adjacent cell modules to form a higher voltage battery stack of cell modules. Within each cell module there are arranged multiple positive and negative electrodes, with each positive and negative electrode electrically connected in parallel to each of the other electrodes of the same polarity. The electrodes are made with any suitable lithium ion battery material for the positive and negative electrodes. For example, the positive active material, or the cathode, may include lithium manganese oxide, lithium cobalt oxide or lithium iron phosphate electrochemically-active material coated onto aluminum The negative active material, or the anode, may include, for example, synthetic graphite or lithium titanate spinel, coated onto copper (or aluminum where the anode is lithium titanate spinel).

Figure 1B:
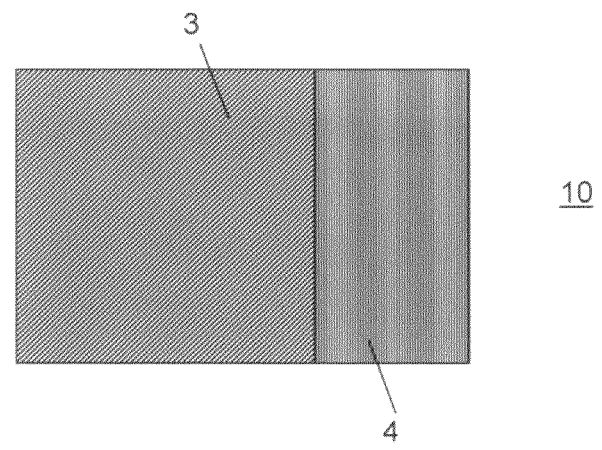
Figure 1C:
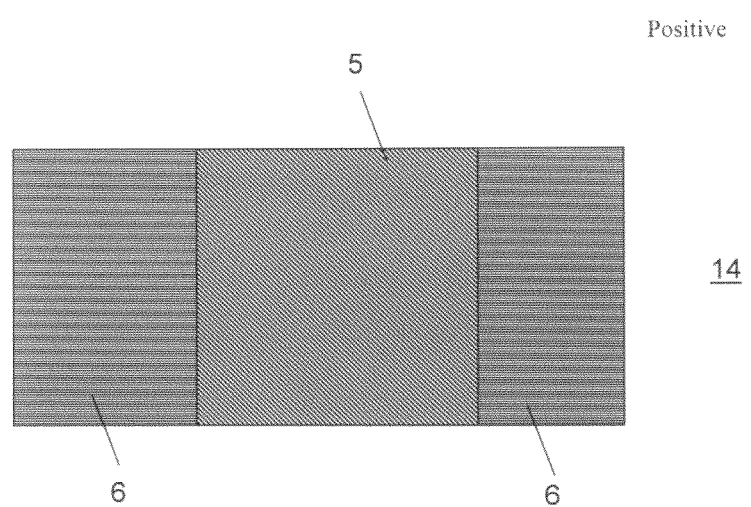
Figure 1D:
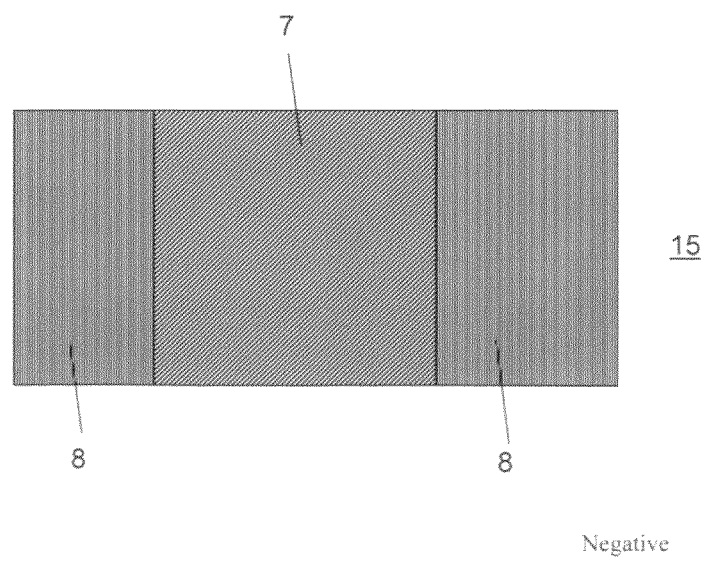

The cell module incorporates multiple electrodes which, in the illustrated embodiments, have four patterns of active material coatings as shown in FIGS. 1A-1D. FIG. 1A illustrates an interior positive electrode 9 (e.g., aluminum) that is coated on both sides with a cathode active material 1 and that has a bare (uncoated) foil tab 2 on one side, and FIG. 1B illustrates an interior negative electrode 10 (e.g., copper or aluminum) that is coated on both sides with an anode active material 3 and that has a bare (uncoated) foil tab 4 on the opposite side to the positive tab. FIG. 1C illustrates a positive end-electrode 14 that is coated on one side only with a cathode active material 5 and that has one or two bare foil tabs 6, and FIG. 1D illustrates a negative end-electrode 15 that is coated on one side only with an anode active material 7 and that has one or two bare foil tabs 8. The advantage of two end plate tabs is to allow improved subsequent sealing of the electrodes in the cell module. In this embodiment, the electrodes 9, 10, 14, 15 are in the form of plates of rectangular shape, it being understood that electrodes of other suitable forms and shapes can be used depending on the desired configuration of the cell module and other design considerations.

Both sides of the end electrodes 14 and 15 that are at opposite ends of the assembled cell module may be uncoated and the surfaces cleaned and etched to achieve improved subsequent sealing to the cell module. The cell module in the present invention preferably is well sealed from water vapor and air ingress.

Figure 2:
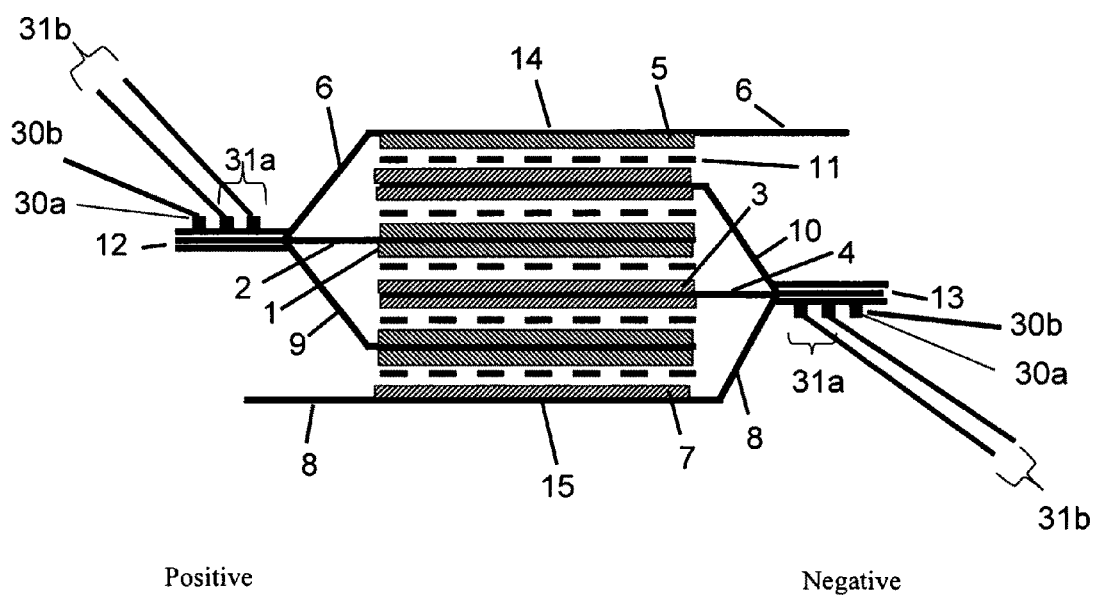
FIG. 2 is a schematic cross section of the electrode arrangement within a single cell module with interleaving electrodes and separators.

In FIG. 2, the positive and negative electrodes (electrode plates) 9, 10, 14, 15 illustrated in FIGS. 1A-1D are shown assembled within a single cell module. In the drawings, the thickness of the active material coatings 1, 3, 5, 7 is greatly exaggerated for clarity. The positive and negative electrodes are electrically connected in parallel to multiple others of the same polarity to form an interleaved electrode assembly which is terminated by the positive end-electrode 14 and the negative end-electrode 15 of the single cell module. As illustrated in FIGS. 1C-1D and FIG. 2, the positive end-electrode plate 14 has two tabs 6 and the negative end-electrode plate 15 has two tabs 8. One of the tabs 6 of the positive end-electrode plate 14 is connected, preferably by welding, to the tabs 2 of the positive electrode plates 9 to form an end tab 12 which constitutes a positive terminal of the cell module. In similar fashion, one of the tabs 8 of the negative end-electrode plate 15 is connected, preferably by welding, to the tabs 4 of the negative electrode plates 10 to form an end tab 13 which constitutes a negative terminal of the cell module. Between the end-electrode plates 14, 15 are positive electrodes 9 interleaved with negative electrodes 10, and between each electrode is a layer of separator 11, with sufficient insulating properties such as a micro-porous polyolefin, containing electrolyte. In FIG. 2, the end-electrode plates 14 and 15 are shown coated on one side only while their other sides are uncoated and through the end tabs 12 and 13 respectively, their other sides present outer positive and negative cell-termination surfaces respectively for subsequent high voltage battery assembly through the interconnectors of the present invention.

In actual practice, the number of electrodes and separator layers is varied and selected to achieve the required electrochemical energy storage capacity and the power required. In addition to increasing the electrochemical energy storage, a larger number of electrodes will allow higher rates of charge and discharge for the same amount of energy. The larger surface area with multiple electrodes in the present invention lowers the specific electrochemical current density per unit electrode area within the cell module, i.e., the amperes per square centimeter of electrode is reduced for a larger number of electrodes so that the electrodes can deliver more total current at a lower current density with less loss in delivery voltage. In batteries, high electrode current density results in reduced battery voltage due to the well-known electrochemical principles of electrode polarization or voltage loss. A multiple of more than 30 electrode pairs, in practice, could typically be bonded with a welder, such as an ultrasonic metal welder, into welded end tabs 12 and 13 of the positive and negative electrodes, respectively. The electrode tabs are preferably connected along the full lengths thereof on opposite sides of the electrode cell module, as illustrated by the end tab 12 on the positive side of the cell module and the end tab 13 on the negative side. The outside top surface of the cell module presents the bare foil surface of the positive end-electrode 14 and the outside bottom surface presents the bare metal surface of the negative end-electrode 15. Voltage and temperature sensors (described later) attached to the individual tabs or to the electrode tabs provide early information related to safety due to their close proximity to the electrode active materials.

Figure 3A:
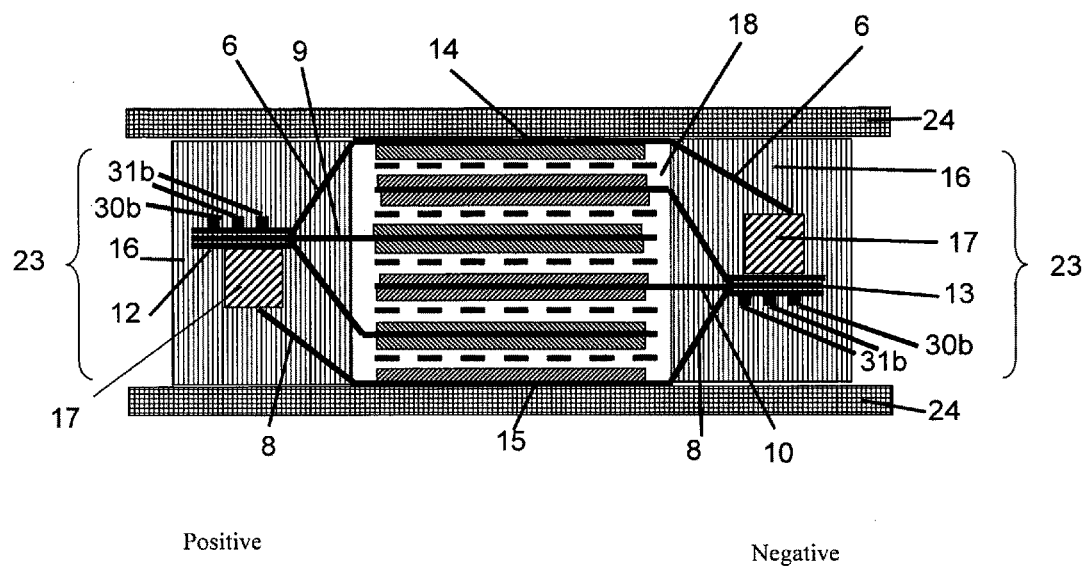

The sealing of the interleaved electrode assembly of FIG. 2 is illustrated in FIG. 3A with the positive and negative active materials shown in cross section for each electrode. As noted above, the end-electrode plates 14, 15 have two tabs and are coated with active material on only one side. Each of the positive and negative end tabs 12 and 13 is sealed with an electrically insulating sealant 16 at the opposite edges of the cell module 23 and electrically isolated one from the other by an insulator 17 where the opposite polarity tabs overlap on the same side as illustrated in FIG. 3A. More particularly, the insulator 17 on the left side of the cell module 23 electrically isolates the tab 8 of the negative end-electrode 15 from the positive end tab 12, and the insulator 17 on the right side electrically isolates the tab 6 of the positive end-electrode 14 from the negative end tab 13. Also in FIG. 3A is shown a gap 18 between the sealant 16 and the ends of the electrodes 9, 10 and the separators 11. The material of the sealant 16 may also seal a plastic frame 19 to the interleaved electrode assembly on each of the sides orthogonal to the sealed end tabs 12 and 13. Methods of sealing include insert-molding, injection molding, fusion welding and adhesive (both reactive, e.g., epoxy, and hot-melt).

Figure 3B:
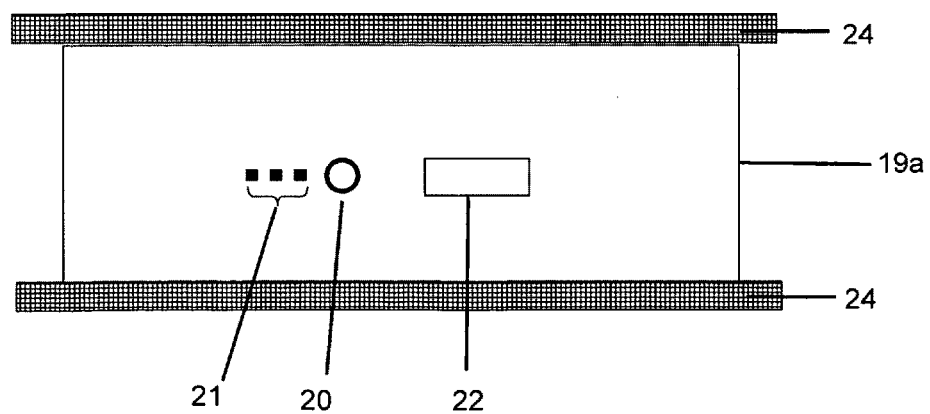
FIG. 3B shows the cell module with the front frame section in place, and both FIGS. 3A and 3B showing placement of interconnectors according to the present invention.
Figure 4:
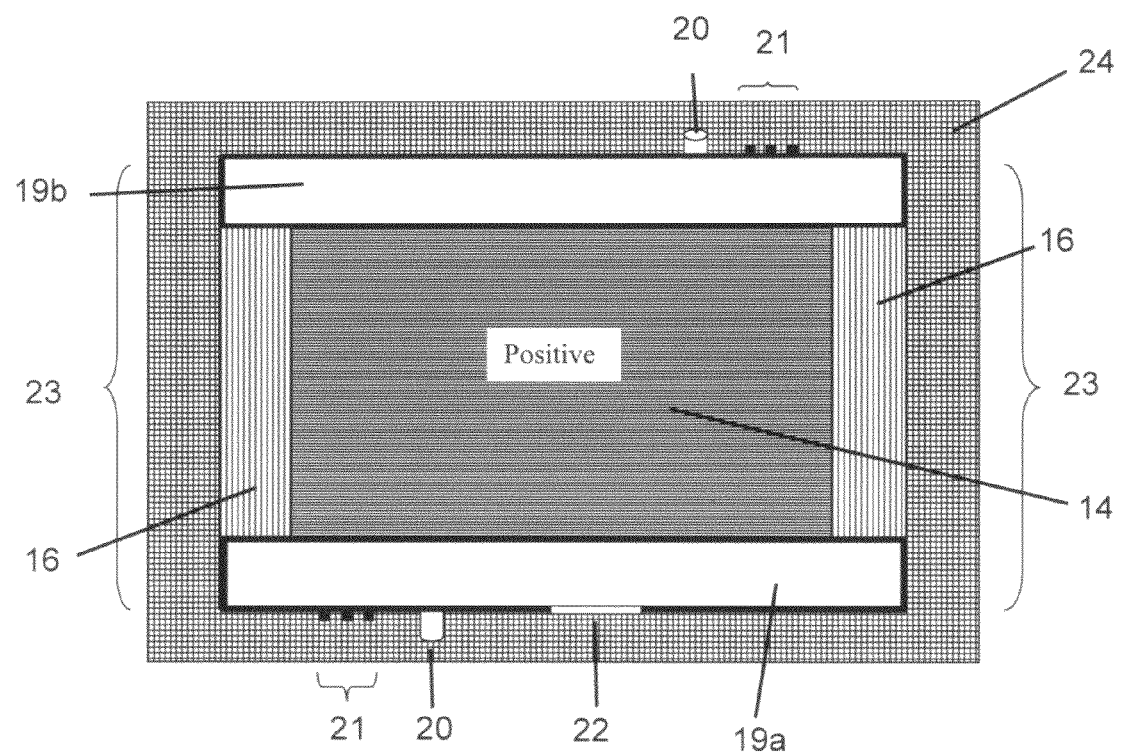
FIG. 4 is a plan view of the cell module with an interconnector underneath and showing the plastic frame with feedthroughs, burst disc and ports.
Figure 5:
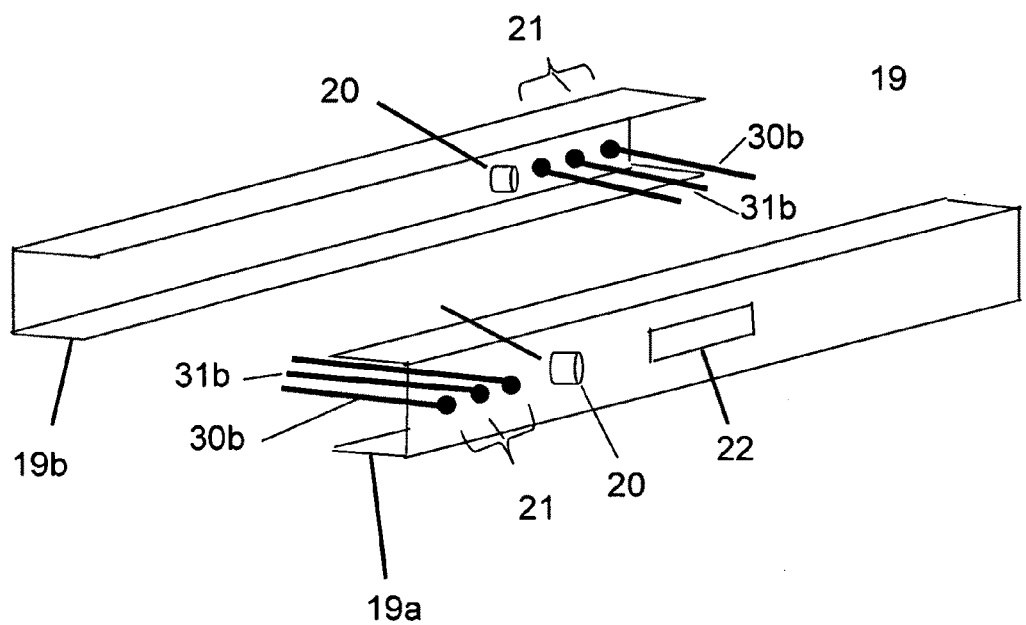
FIG. 5 is a perspective view of the plastic frame with communicating feedthroughs for filling, sealing and sensing.

As shown in FIGS. 4 and 5, the plastic frame 19 is a two-part frame having front and rear, generally C-shaped, frame sections 19a, 19b that are inserted over the interleaved electrode assembly and the sealant 16 at the front and rear of the cell module 23 and sealed thereto. FIG. 3A shows the cell module 23 without the frame 19, and FIG. 3B shows the cell module 23 with the front frame section 19a sealed to the cell module. FIG. 3B illustrates features incorporated in the frame 19a including a port 20 for evacuating, filling and draining the cell module with electrolyte which can also be permanently or temporarily sealed by mechanical means, electrical feedthroughs 21 for measuring and monitoring individual cell voltages and temperatures, and a burst disc 22 to relieve any pressure build up within the cell module 23.

In order to electrically connect stacked cell modules 23 in series, electrically conductive compressible interconnectors 24 are interposed between adjacent cell modules. FIG. 3 shows upper and lower interconnectors 24 for series connection to additional cell modules above and below the illustrated cell module 23. FIG. 4 is a top plan view of the sealed cell module 23 with the upper interconnector 24 omitted and the outside surface (bare foil surface) of the negative end-electrode 15 of the cell module in contact with the lower interconnector 24.

As illustrated in FIGS. 2 and 3A, the tabs 2, 4, 6, 8 of the electrode plates are shown sharply bent at an angle to overlap one another to form the end tabs 12, 13. It is of course possible, and sometimes preferable, to bend the tabs with a curvature rather than the sharp bending shown. Also, as illustrated in FIGS. 1C and 1D, the widths of the tabs 6 and 8 of the end-electrode plates 14, 15 could be different on opposite sides (left/right sides) of the end-electrode plates, the wider width tabs being connected to the end tabs or terminals 12, 13 and the narrower width tabs sitting on the insulators 17. The ports 20 are preferably placed on diagonal corners for subsequently filling and vacuum degassing the cell module after formation.

In this embodiment, as shown in FIGS. 2, 3A and 3B, voltage sensors 30a are attached to both the positive end tab 12 and the negative end tab 13, which permit monitoring the voltage of any cell within a battery stack of cell modules and adjusting its state of charge to balance cells within a multi-cell-module battery through an external battery management system (BMS). Temperature sensors 31a, such as thermistors, are mounted in contact with both the positive end tab 12 and the negative end tab 13 to monitor the temperature of the electrodes of the cell module 23. The voltage sensors 30a and the temperature sensors 31a are electrically connected by sense lines (conductors) 30b and 31b, respectively, to the electrical feedthroughs 21 provided in the front and rear frame sections 19a, 19b, as illustrated in FIG. 5. The cell module 23 is furnished with the burst disc 22 to relieve excess internal pressure in the event of a catastrophic cell failure.

The complete cell module 23 is intended as a manufacturing module that is handled in a dry-room environment throughout cell formation and vacuum degassing. In addition to measurement of the individual cell module voltages, the voltage sensors may also be used to measure any resistive component between the cell modules, for example, arising at the mechanical contacts between the interconnector 24 and the positive end-electrode 14 of one cell module and between the interconnector 24 and the negative end-electrode 15 of an adjacent cell module. As discussed herein, although use of an inert gas in the vicinity of the interconnector electrical contacts is desirable to prevent or reduce the development of an electrically-resistive layer between the interconnector and the cell module electrical surface contact, the capability to continuously monitor the electrical resistivity of such mechanical contacts is an additional benefit and feature of the present invention.

In an automated assembly process, or in mass manufacturing, all four sides of the interleaved electrode assembly may be sealed into the plastic frame 19 in a single step while simultaneously incorporating fill holes, burstable areas and embedded sensor wiring in the same or subsequent refinement steps. In an automated manufacturing process, the plastic frame may be eliminated entirely by, for example, use of injection molding in which the interleaved electrode assembly of FIG. 2 is placed between top and bottom molds each in contact with the other and enclosing an open continuous perimeter volume into which an electronically-insulating polymeric sealing material is injected to make a continuous cell module perimeter seal incorporating perhaps prior-positioned fill tubes, sensors and thin areas for burst protection.

Interconnector

Figure 6A:
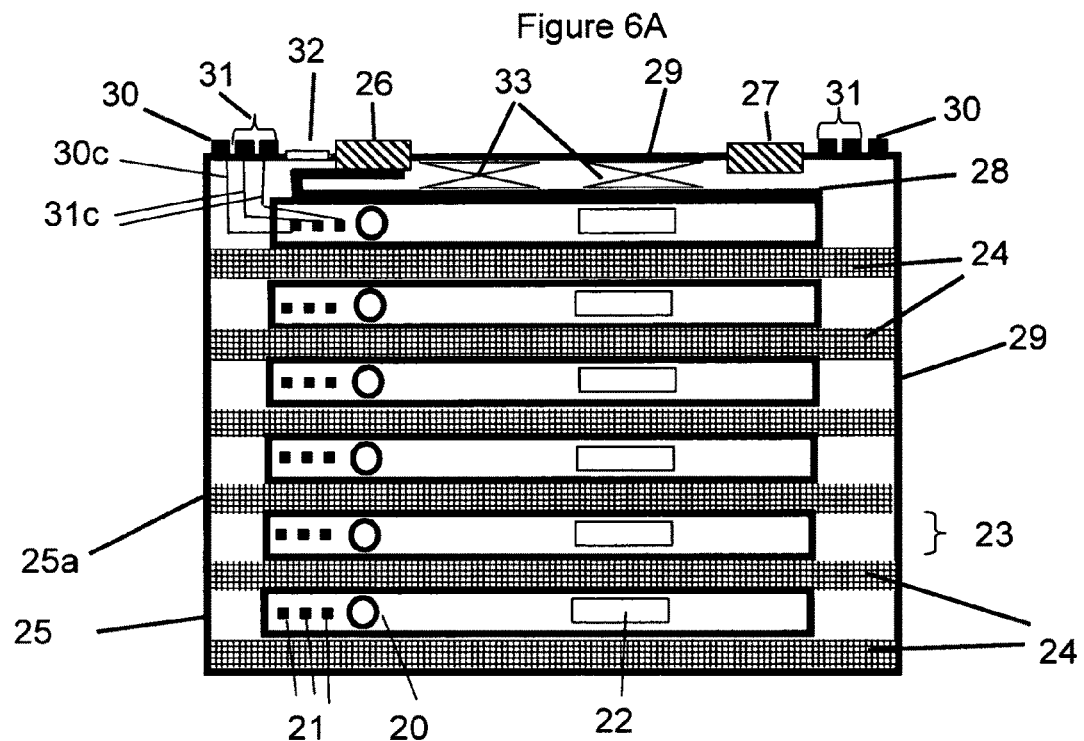

The present invention provides interconnectors 24, shown for Example in FIG. 6A, which advantageously can be compressible to provide cushioning for shocks or vibrations between the planar cell modules 23. The interconnectors 24 for example can be compressible flexible conductive sheets that provide a multiplicity of parallel conduction paths. The flexibility of the interconnectors 24 can accommodate cyclic strains within the cell stack during charging and discharging the battery, while maintaining electrical contact between the cell plane modules through application of a force that assures good contact and low electrical resistance between the modules. The compressible interconnectors 24 can be made any material that has sufficient properties such as, for example a wire mesh, metal or carbon fibers retained in a compressible elastomeric matrix, or an interwoven conducting mat, consistent with the requirement for a compressible flexible electrically-conducting interconnection between adjacent cell plate module surfaces. The contacting surfaces of the cell modules can be chosen to maintain a long-term, low-resistance connection interface with the surfaces of the positive and negative connections of the cell module.

The mesh for example can be of filaments of approximately 4 mils, or 0.004 inches. The compressibility of the interconnector can be for example 30 percent, so that for example upon application of sufficient force to reduce spacings in the weave, the volume of the interconnect decreases to 70 percent of the volume prior to application of force. Thus an interconnect layer having a thickness of 10 mils can compress to a thickness of 7 mils upon pressure on the planar surfaces, given a layer structure in which during this compression the layer does not expand out of the sides perpendicular to the pressure direction. Preferably, the compressibility of the interconnector is such that the volume can compress to less than 90 percent.

In addition, certain interconnectors of the present invention advantageously can improve the conductivity of the cell module connection, as opposed to the prior art using direct metal-to-metal contact between adjacent cells or the use of conducting cements or pastes between adjacent cells. Table 1 shows various materials that were used to make compressible weaves or felts of interconnector material in accordance with the present invention. Some of the fibers had a surface finish to improve stability of the contact material of the interconnector.

TABLE 1

Materials Used for Interconnector Pads of the Present Invention

| Material | Fiber | Surface Finish | Thickness Inch | Pad Weight gram/in2 |
|---|---|---|---|---|
| A | copper/steel wire | Tin | 0.020 | 0.33 |
| B | monel wire | None | 0.020 | 0.31 |
| C | aluminum wire | None | 0.021 | 0.10 |
| D | nylon felt | Silver | 0.072 | 0.24 |
| E | woven nylon | Silver | 0.015 | 0.08 |
| F | carbon fiber | Nickel | 0.018 | 0.25 |
| G | non-woven polyester | Copper | 0.012 | 0.04 |
| H | non-woven polyester | Nickel | 0.014 | 0.17 |

Interconnectors in the form of one inch square pads of material made from the materials illustrated in Table 1 were placed between pressure plates surfaced with metal foils of Al or copper (Al and Cu simulate the outer surfaces of the example Li ion cell modules of the present invention) and the electrical resistance was measured on application of electrical current and mechanical pressure to the interconnector pads via the pressure plates with Al or Cu foil surfaces. The resulting electrical resistances measured under the same conditions and for the same areas of interconnector are shown in Table 2. The pressure applied was approximately 10 pounds per square inch.

TABLE 2

Electrical Resistance Values for Interconnection between Al and Cu Surfaces

| Lower Foil | Upper Foil | Interconnector | Interconnection Resistance (milliohms) |
|---|---|---|---|
| aluminum | aluminum | None | 35 |
| copper | aluminum | None | 3.0 |
| aluminum | aluminum | A | <1 |
| aluminum | aluminum | B | 2.5 |
| aluminum | aluminum | C | 37 |
| aluminum | aluminum | D | 5.1 |
| aluminum | aluminum | E | 2.8 |
| aluminum | aluminum | F | 18 |
| aluminum | aluminum | G | 2.8 |
| aluminum | aluminum | H | 127 |
| copper | aluminum | A | <1 |
| copper | aluminum | B | 3.0 |
| copper | aluminum | Conducting Silver Cement | 40 |
| copper | aluminum | Conducting Graphitic Cement | 130 |
| copper | aluminum | Conducting Paste | 2.6 |

Interconnector A for example is a preferred embodiment of the interconnector of the present invention, and may for example be made from electromagnetic interference/radio frequency interference shielding products such as gaskets available from the MAJR Products Corporation of Saegertown, Pa.

Several of the interconnectors 24 of the present invention, in addition to reducing shock and vibrations, for example from road shock, can improve or maintain electrical resistance. Continuity in current flow between interconnected cell modules in the presence of vibrations is also an important safety and reliability feature for the vehicle because if there were a diminution or a single point break in continuity of current flow, reduced or no power output from the battery could be obtained since a single point break or diminution in current flow between any pair of cell modules in any modular battery would also "disconnect" or diminish current flow respectively for all of the other series-connected cell modules from power delivery for the vehicle, which essentially immobilizes the entire vehicle. This could also become a vehicle safety issue in an emergency situation where the vehicle must avoid a road accident for instance. The use of compressible springy interconnectors in accordance with the present invention can avoid the occurrence and effects of a "single point failure" or diminution of current flow and sharply contrasts with the use of conductive cements and pastes in the prior art which may not be not capable of withstanding excessive vibrations or continual road shocks without physically breaking or changing electrical connectivity and current continuity.

The interconnectors also have the advantage of being removable to permit easy removal of the cell modules and replacement of defective cell modules.

The interconnectors preferably are used between aluminum-aluminum or aluminum-copper end electrodes of a cell module, and preferably include nickel, tin, silver or copper, and most preferably copper or silver. To improve and maintain the interface connection, the surfaces of the interconnectors 24 may for example be surface treated, such as by tin plating or indium plating.

To illustrate the advantages of the present invention in absorbing vibrations (pressure changes) without change of electrical resistance, Table 3 shows the effect of pressure on the electrical resistance of the compressible interconnector of the present invention at different applied pressures. Increase in the pressure applied to a one inch square pad of interconnect material A (Table 1) produced no further reduction in electrical resistance above an applied pressure of 15 pounds per square inch (psi).

TABLE 3

Electrical Resistance Values for Interconnection Material A between Al and Cu Surfaces

| Pressure (psi) applied to interconnector pad (A) between Cu and Al Foils | Interconnection Resistance (milliohms) |
| --- | --- |
| 0 | 0.19 |
| 10 | 0.06 |
| 15 | 0.01 |
| 20 | 0.01 |

Modular Battery

Figure 6B:
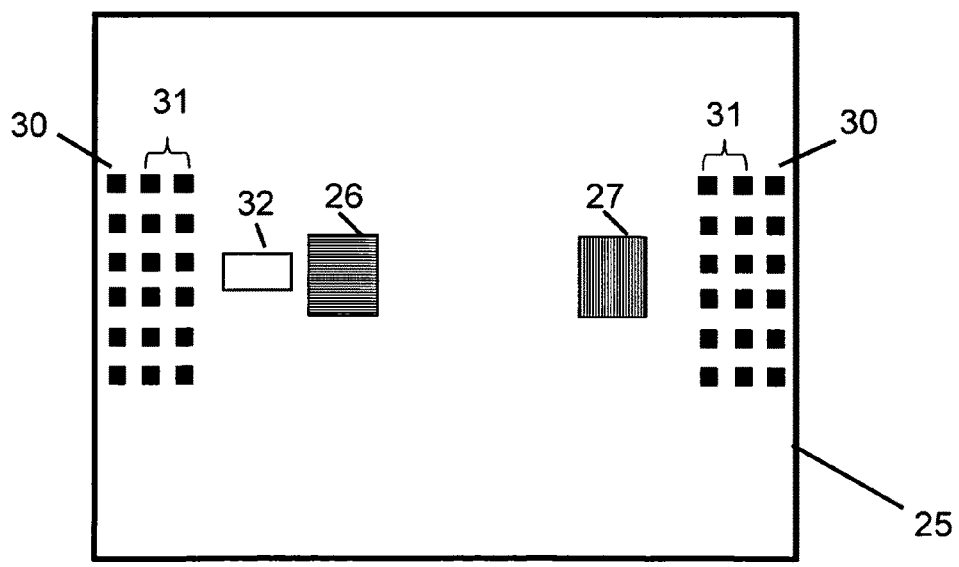
FIG. 6B shows a plan view.

FIGS. 6A and 6B illustrate how multiple cell modules can be arranged to form a battery stack to provide a high-voltage and high-power modular battery. FIG. 6A shows six cell modules stacked one on another and separated by the compressible interconnectors 24 of the present invention which serve to electrically connect in series one cell module to the next cell module. It is noted that several interconnectors can be present between two cell modules, for example 8 layers, each 10 mils in thickness. Thus the space between cell modules for example can be 80 mils, and compressible to 60 mils when in use.

By way of example and as described above, the positive cell module surface may be made of aluminum and the negative cell module surface made of copper. The interconnectors 24 may extend beyond the cell modules to contact the inner walls of the battery enclosure, providing a path of low thermal impedance to assist in removing heat from the battery while simultaneously maintaining electrical isolation from other interconnectors within the stack of cell modules.

In the illustrative example in FIG. 6A, six cell modules 23 are contained in a stacked array within an enclosure 25 which, in this embodiment, is of rectangular cross section. The enclosure 25 is a hermetically-sealed case, which for example may be made from aluminum, preferably either fabricated from sheet metal or made of cast construction. To permit stacking and assembly of the cell modules 23, and removal and replacement of individual cell modules after assembly, the top or bottom, or one of the sides, of the enclosure 25 is detachably connected to the enclosure by threaded bolts or other suitable fasteners. The enclosure 25 provides the ability to locate the cell modules and interconnectors in a stack in a robust mechanical configuration that withstands shock and vibration in the battery operating environment and if electrically conducting also serves as the negative connection for power to and from the battery. In FIG. 6A, six cell modules are shown for illustrative purposes, whereas a practical battery may accommodate 20 to 30 cell modules or more. The present invention allows a large number of cell modules to be interconnected to make a very high-voltage battery stack.

The sides of the enclosure 25 in FIG. 6A are thermally in contact with the interconnectors 24 to facilitate heat transfer from the cells to the outside environment. At least two, but even all four sides of the enclosure 25 are in thermal contact with edges of the interconnectors 24 to maximize heat transfer to the outside environment. Electrical isolation between the cell modules 23 and the walls of the enclosure 25 is furnished by a double layer of thermally conductive but electrically insulating material 25a, such as for example an electrically-insulating coating from hard anodizing of an aluminum enclosure on the interior of the enclosure, and an elastomeric electrically-insulating and thermally-conducting gasket around the edge of each interconnector, although any material with suitable thermally-conductive and electrically-insulating properties could be used. Heat dissipation from the cell modules may be further enhanced by adding fins to the exterior of the enclosure (thereby improving convective heat-transfer), and by back-filling the interior volume of the enclosure with helium gas (thereby improving conductive heat transfer). Filling the enclosure with an inert gas also reduces the potential for undesirable metal oxidation which may increase the electrical resistance of the interconnection points between the interconnectors and the external surfaces of the cell modules. Aluminum is particularly susceptible to such oxidation in the presence of air and can form a hard electrically-resistive oxide film.

Selection of electrode active materials that undergo thermodynamic or entropic cooling on discharge is also advantageous in reducing heat generation and temperature rise in a battery since on discharge Ohmic heating occurs proportional to the square of the discharge current ($i^2R$). Ohmic heating can be counteracted by the entropic cooling to such a degree that a battery of the present invention, on discharging, may actually cool to a lower temperature than at the start of discharging. For example, we have found that a cell module of the present invention with a lithium iron phosphate cathode and a carbon anode on discharge at a given current (equivalent to a C rate) cooled by 10° C. on discharge.

The enclosure 25 incorporates feedthroughs for the power input and output terminals, namely, a positive terminal 26 and a negative terminal 27. The power terminals connect internally to the ends of the cell module battery stack through an internal power bus 28 for the positive terminal 26 and the electrically conductive enclosure 25 serves as the negative bus 29 to the negative terminal 27. The enclosure 25 is provided with external multipin connectors 30 and 31 for monitoring cell voltage and cell temperature, respectively, and these connectors may be positioned in the same region as the power terminals 26 and 27. In the illustrated embodiment, there are six sets of multipin connectors 30 and 31 (FIG. 6B), one set for each cell module 23. The sense lines 30b and 31b of each cell module are connected via the electrical feedthroughs 21 to sense lines 30c and 31c which, in turn, are connected to respective ones of the multipin connectors 30 and 31. To facilitate removal and replacement of individual cell modules 23 from the stacked array, the sense lines 30c, 31c may be connected to the feedthroughs 21 by pin-and-socket connectors or other suitable connectors that permit easy attachment and detachment. In FIG. 6A, the internal connections of the sense lines 30c, 31c from the multipin connectors 30 and 31 to the cell modules 23 are only shown for one cell module. In practice, connections could run to some or all cell modules in the battery stack. Data acquisition, as discussed above, from the individual sensors 30a and 31a is sent to a stand-alone or an integrated analysis, control and communications module within the overall vehicle system. An external pressure relief device 32 may be provided to safely handle any high pressure failure modes of the battery stack. The use of multipin connectors 30 and 31 in the present invention facilitates replacement of individual cell modules.

The use and arrangement of the cell module interconnectors 24 in the present invention may serve at least two purposes: (1) to electrically connect adjacent cell modules 23, and (2) to efficiently remove heat generated within the cell modules through the external surfaces of the end-electrode plates 14 and 15 to the walls of the enclosure 25. Although the present invention is illustrated herein with an electrically conducting enclosure 25, it could also be made of a non-electrically-conducting material, in which case a separate negative bus 29 would connect the negative surface of the cell module 23 at the one end of the stack of cell modules 23 to the negative terminal 27 of the battery. An advantage for example of using a non-metallic electrically insulating enclosure 25 could be lower cost and lighter weight, and the interconnectors 24 would not need to be electrically insulated from the walls of the enclosure 25 if the material of the enclosure 25 was also electrically non-conducting. Use of heat-conducting material in the walls of the enclosure to facilitate heat removal from the interconnectors to the outside of the enclosure 25 would be advantageous as would be the use of active or passive cooling means adjacent to the outside walls of the enclosure 25, for example, a heat absorbing material or flowing coolant in contact with the outside walls of the enclosure would benefit heat dissipation.

For lower electrical resistance between cell modules 23 in the battery stack, pressure can be applied to the compressible interconnectors 24 between the cell modules 23. An example of how this might be readily achieved is shown in FIG. 6A where a spring 33 is located at the top of the enclosure 25 and positioned between the positive electrical bus 28 and the top of the enclosure 25. Spring 33 transmits pressure to the interconnectors 24 within the stack of cell modules 23. Additionally, or as an alternative, a spring may be incorporated at the bottom of the enclosure 25 to apply pressure from below to the stack of cell modules 23 and interconnectors 24.

Figure 7:
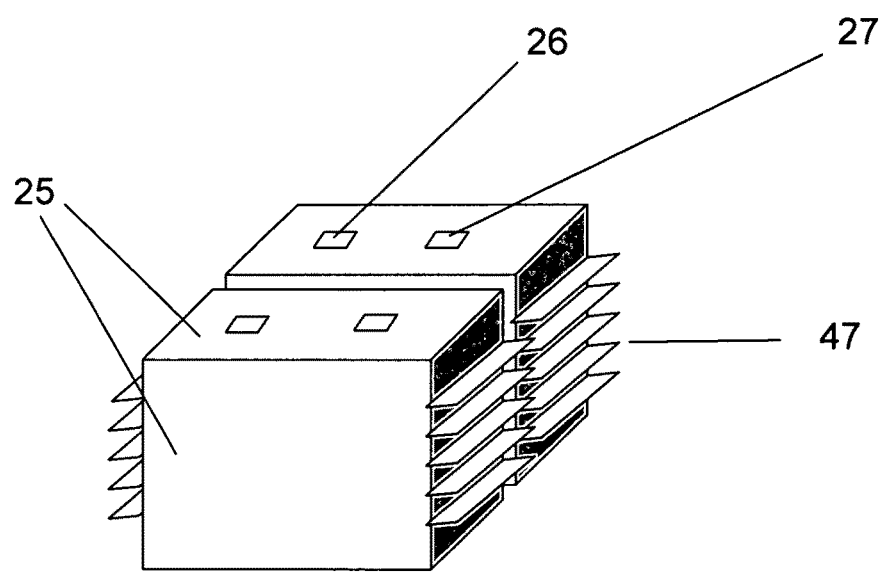
FIG. 7 schematically illustrates an arrangement for packing two modular batteries together.

In FIG. 6A, the terminals 26 and 27 and the multipin connectors 30 and 31 and the burst disc 32 and gas port 34 are illustrated as being positioned on the top surface of the enclosure 25, where the surface is parallel to the end electrodes 14 and 15. In accordance with the present invention, all of these elements could be positioned on one or more sides of the enclosure 25 allowing additional sealed cell-module battery stacks to be closely packed together (though not in electrical contact) for applications requiring multiple battery stacks as, for example, HEV applications. Alignment of cooling fins 47 on the two sides adjacent to the sides containing the terminals, etc., as illustrated in FIG. 7, would further assist in heat removal in a multi-battery assembly.

The enclosure 25 provides the following features: a means of compression of the stack of cell modules, a hermetically sealed enclosure, and a means for electrical connection to the surfaces of the end cell modules.

During operation of the battery of the present invention, an electronic management system may be provided to continuously monitor cell module voltages and cell module temperatures, as well as the voltage drop across the interconnectors. Such extensive monitoring of battery function with such close coupling of the sense points to cells, allows for improved battery monitoring and leads to improved battery safety. A simple schematic data monitoring and alerting arrangement between a central monitoring center and an HEV is shown in FIG. 8.

Figure 8:
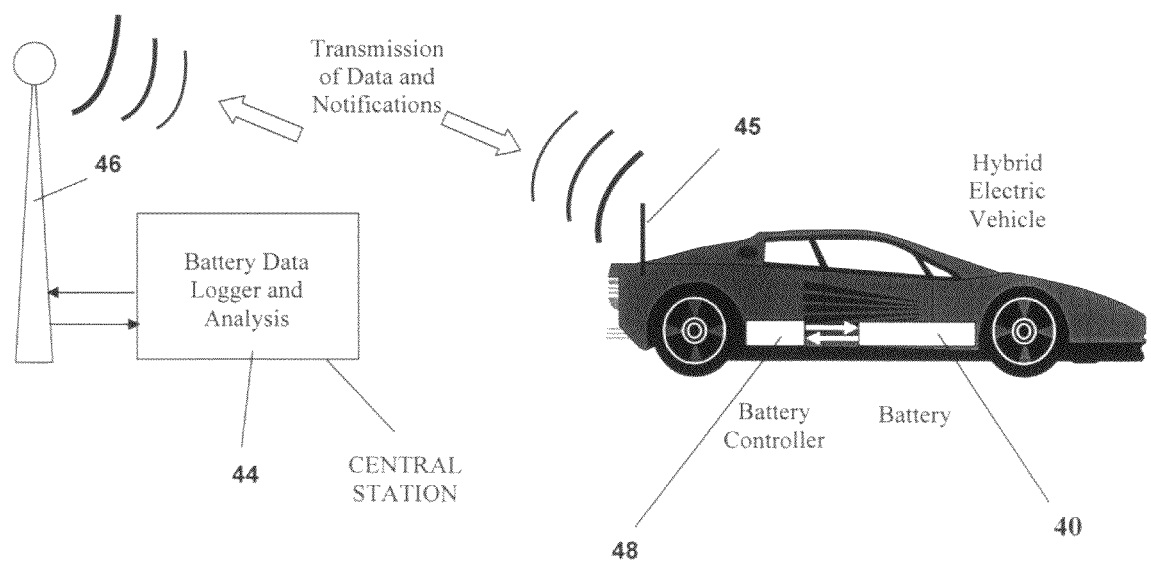
FIG. 8 is an explanatory view illustrating remote monitoring and alerting of the battery and its cell module.

In FIG. 8, an HEV is equipped with a battery 40 comprised of multiple series-connected cell modules constructed according to the present invention. The battery 40 is connected to a battery controller 48 which monitors and controls the battery performance in a manner known in the art. The battery controller 48 communicates with a central station 44 through a wireless communications network which includes an antenna 45 mounted on the HEV and a central station antenna 46. The battery controller 48 continuously monitors the voltage and temperature of each cell module and, when necessary, reduces the current flow through one or more cell modules to maintain the current at a safe level. The battery controller 48 transmits monitoring data to the central station 44 and receives notification data from the central station to regulate operation of the battery 40.

Charge transfer through the voltage sense leads may be used to keep the electrochemical capacity of the cells in balance. High-voltage and/or high temperature indications would trigger the battery management system to take corrective action, such as disconnecting the battery from its charging source—an important safety feature particularly for HEV applications. Drift of parameters over time could be an indicator for required maintenance. The modular battery design of the invention with its separable connections between cell modules readily permits battery disassembly and replacement of defective components, greatly extending the service life of the entire battery built in the inventive manner.

The use of planar or flat electrodes in the cell module of the present invention allows thicker coatings of positive and negative material to be used on the electrode plates than can be practically used with electrodes which have to be bent to make, for example, a cylindrical cell in which the electrodes are bent to form a spiral, which is a common method of construction of many battery cells. There are limitations to the thicknesses of coatings on electrodes that have to be bent into a spiral form for cylindrical cells, because bending of an electrode with a thick coating of active material can cause stress within the thick coating which can result in cracking of the active material and subsequent loss of direct electrical contact to the supporting and conducting surface which, in turn, would reduce the usable Ampere-hour (Ah) capacity particularly at high electrical currents. A significant increase in the available Ah capacity of a cell module of the present invention can be achieved with the use of planar or flat electrodes with thicker coatings of the active materials and such increase in capacity would be attained with an increase in the specific energy density (Watt-hours per unit weight or volume) because of the relative increase in the ratio of weight and volume of the active material to the weight and volume of the inactive materials of the electrode, principally the active material supporting structures (for example the copper and aluminum active material supports of the examples given herein)

Although the electrodes in the illustrated embodiments are disclosed as preferably having a square or rectangular planar form, other planar forms can be made in accordance with the present invention. For example, a cell module of the present invention can also be of cylindrical form by, for example, cutting the positive and negative electrodes into the form of planar discs and interleaving them with a separator in an offset manner to allow for subsequent welding together of all the positive electrode planar discs and separately all of the negative electrode planar discs. The perimeter sealing of the welded stack of interleaved electrodes with sensing and filling feedthroughs could be accomplished using a curved frame, for example, semicircular. The resulting cell modules would resemble in appearance thick discs or flattened cylinders which would then be stacked on one another and electrically connected with the interconnectors of the present invention and subsequently sealed into an enclosure to make a cylindrical multicell battery with a positive end surface disc and a negative end surface disc. The flexibility in shape, size and form factors of the cell module of the present invention enables maximum utilization of available space within an application requiring a battery and enable flexible customizable manufacturing of cell modules.

While the invention herein described is illustrated with particular reference to a lithium battery, other battery chemistries would benefit from the invention. In particular, batteries requiring very high rates of charge and discharge as in HEV applications would especially benefit due to the large interconnection area between adjacent cell modules and the large number of the positive and negative electrodes. Such a large interconnection area between adjacent cell modules which is made possible with the present invention lowers the specific current density, i.e., the amperes per square centimeter, so that the electrodes can deliver more total current at a lower current density with less voltage loss for the cell module. In batteries, high current density on an electrode results in reduced battery voltage due to the well known electrochemical principles of electrode polarization.

Battery chemistries benefiting from the present invention include all lithium batteries, as well as Pb-acid, Ni-metal hydride, Ni—Zn, and other rechargeable as well as primary or non-rechargeable batteries.

It will be appreciated by those ordinarily skilled in the art that obvious variations and changes can be made to the examples and embodiments described in the foregoing description without departing from the broad inventive concept thereof. It is understood, therefore, that this disclosure is not limited to the particular examples and embodiments disclosed, but is intended to cover all obvious modifications thereof which are within the scope and the spirit of the disclosure as defined by the appended claims.

What is claimed is:

1. A modular battery comprising:
   a first planar battery cell including a plurality of positive electrodes connected to each other in parallel and a plurality of negative electrodes connected to each other in parallel, one of the electrodes of the first planar battery cell having a first planar electrode surface;
   a second planar battery cell including a plurality of positive electrodes connected to each other in parallel and a plurality of negative electrodes connected to each other in parallel, one of the electrodes of the second planar battery cell having a second planar electrode surface; and
   a compressible interconnector disposed between the first planar surface and the second planar surface and electrically connecting the first and second planar electrode surfaces.

2. The battery as recited in claim 1 wherein the compressible interconnector includes a layer containing electrically conducting fibers.

3. The battery as recited in claim 2 wherein the fibers include metallic wire.

4. The battery as recited in claim 3 wherein the metallic wire includes an inner metallic core and an outer tin coating.

5. The battery as recited in claim 1 wherein the compressible interconnector includes a fiber mesh.

6. The battery as recited in claim 1 wherein the compressible interconnector includes an electrically conducting material lowering a resistance between the first and second planar electrode surfaces.

7. The battery as recited in claim 1 wherein the compressible interconnector has an uncompressed volume and wherein the compressible interconnector is compressed to less than 90 percent of the uncompressed volume when disposed between the first planar battery cell and the second planar battery cell.

8. The battery as recited in claim 1 wherein the first planar electrode surface defines a positive terminal of the first planar battery cell and the second planar electrode surface defines a negative terminal of the second planar battery cell.

9. The battery as recited in claim 1 wherein the first planar electrode surface is made of aluminum and the second planar electrode surface is made of aluminum.

10. The battery as recited in claim 1 wherein the first planar electrode surface is made of aluminum and the second planar electrode surface is made of copper.

11. The battery as recited in claim 1 further comprising a pressurizer for compressing the interconnector.

12. The battery as recited in claim 11 wherein the pressurizer is a spring.

13. The battery as recited in claim 1 wherein the second planar battery cell has a further planar electrode surface and further comprising a third planar battery cell having a third planar electrode surface and a second compressible interconnector disposed between the further planar surface and the third planar surface and electrically connecting the further and third planar electrode surfaces.

14. A vehicle comprising the battery as recited in claim 1.

15. A modular battery comprising:
   a first planar battery cell having a first planar electrode surface;
   a second planar battery cell having a second planar electrode surface; and
   an interconnector disposed between the first planar surface and the second planar surface and electrically connecting the first and second planar electrode surfaces, the interconnector including electrically conducting fibers, the compressible interconnector having an uncompressed volume and being compressed to less than 90 percent of the uncompressed volume when disposed between the first planar battery cell and the second planar battery cell.

16. A method for assembling a modular battery comprising:
   placing a first planar battery cell in a housing, the first planar battery cell including a plurality of positive electrodes connected to each other in parallel and a plurality of negative electrodes connected to each other in parallel, one of the electrodes of the first planar battery cell having a first planar electrode surface,
   placing an interconnector over the first planar battery cell, the interconnector being one of a compressible interconnector, an interconnector including electrically conductive fibers, or a modular interconnector unit,
   placing a second planar battery cell over the interconnector, the second planar battery cell including a plurality of positive electrodes connected to each other in parallel and a plurality of negative electrodes connected to each other in parallel, one of the electrodes of the second planar battery cell having a second planar electrode surface; and
   forcing the first planar battery cell and the second planar battery cell toward each other.

17. A method of maintaining a battery comprising:
   monitoring a set of planar battery cells;
   identifying a defective planar battery cell from the set of substantially planar battery cells;
   removing the defective planar battery cell, causing a compressible interconnector to expand from a compressed state to an uncompressed state having an uncompressed volume; and
   inserting a non-defective planar battery cell in a manner that compresses the compressible interconnector from the uncompressed state to the compressed state, the compressible interconnector compressed to less than 90 percent of the uncompressed volume when in the compressed state.

18. The battery as recited in claim 1 wherein the compressible interconnector is removable as a modular unit with respect to the first and second planar battery cells.

19. The battery as recited in claim 15 wherein the first planar battery cell has a plurality of positive and negative electrodes connected in parallel, one of the electrodes of the first planar battery cell having the first planar electrode surface, the second planar battery cell having a plurality of positive and negative electrodes connected in parallel, one of the electrodes of the second planar battery cell having the second planar electrode surface.

* * * * *